United States Patent
Bhatti et al.

(10) Patent No.: US 7,526,256 B2
(45) Date of Patent: Apr. 28, 2009

(54) TRANSFORMER-BASED MULTI-BAND RF FRONT-END ARCHITECTURE

(75) Inventors: Iqbal Bhatti, Rancho Palos Verdes, CA (US); Jesus Castaneda, Los Angeles, CA (US); Bojko F. Marholev, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 523 days.

(21) Appl. No.: 11/136,850

(22) Filed: May 25, 2005

(65) Prior Publication Data

US 2006/0270377 A1 Nov. 30, 2006

(51) Int. Cl.
| | |
|---|---|
| H04B 1/38 | (2006.01) |
| H04B 1/44 | (2006.01) |
| H04B 3/00 | (2006.01) |
| H04L 25/00 | (2006.01) |
| H04L 25/06 | (2006.01) |
| H04L 25/10 | (2006.01) |
| H01Q 9/28 | (2006.01) |
| H03H 5/00 | (2006.01) |

(52) U.S. Cl. .............................. 455/73; 455/78; 455/83; 375/258; 375/318; 343/795; 333/25

(58) Field of Classification Search ................. 455/333, 455/341, 73, 77, 78, 557, 562.1, 90.1, 168.1, 455/180.1, 303, 83; 375/258, 318; 343/850, 343/795, 700, 859; 333/25
See application file for complete search history.

(56) References Cited

U.S. PATENT DOCUMENTS

| | | | | |
|---|---|---|---|---|
| 5,809,408 A | * | 9/1998 | Fujimoto et al. | ......... 455/234.2 |
| 6,529,721 B1 | * | 3/2003 | Tiller | ......................... 455/323 |
| 6,603,383 B2 | * | 8/2003 | Gevorgian et al. | .......... 336/200 |
| 6,707,367 B2 | * | 3/2004 | Castaneda et al. | ........... 336/200 |
| 6,823,292 B2 | * | 11/2004 | Spencer | ...................... 702/190 |
| 6,871,059 B1 | * | 3/2005 | Piro et al. | .................... 455/333 |
| 7,120,414 B2 | * | 10/2006 | Kim et al. | ................... 455/313 |
| 7,209,727 B2 | * | 4/2007 | Castaneda et al. | ........... 455/341 |
| 7,292,827 B2 | * | 11/2007 | McCorkle | ..................... 455/78 |
| 2003/0114129 A1 | * | 6/2003 | Jerng | ......................... 455/323 |
| 2003/0137383 A1 | * | 7/2003 | Yang et al. | .................. 336/200 |
| 2003/0157918 A1 | * | 8/2003 | Gamliel | ...................... 455/326 |
| 2003/0160684 A1 | * | 8/2003 | Cern | ...................... 340/310.01 |
| 2004/0017278 A1 | * | 1/2004 | Castaneda et al. | ........... 336/200 |
| 2004/0169566 A1 | * | 9/2004 | Guitton et al. | ................. 333/25 |
| 2004/0207504 A1 | * | 10/2004 | Yang et al. | .................. 336/223 |
| 2006/0091970 A1 | * | 5/2006 | Mondal | ...................... 333/25 |
| 2006/0292996 A1 | * | 12/2006 | Malasani et al. | .............. 455/78 |
| 2007/0052491 A1 | * | 3/2007 | Kintis et al. | .................. 333/25 |
| 2007/0105504 A1 | * | 5/2007 | Vorenkamp et al. | ........... 455/73 |

* cited by examiner

*Primary Examiner*—Nay A Maung
*Assistant Examiner*—Andrew Wendell
(74) *Attorney, Agent, or Firm*—Garlick Harrison & Markison

(57) ABSTRACT

An apparatus and method for allowing two different signal paths to be coupled to a multi-tap transformer balun. The multi-tap transformer has a first port, which is coupled to a single antenna, and two or more differential secondary ports. Each port has one or more taps, which are optimized separately for each of the signal paths, allowing each of the two or more signal paths to operate in different frequency bands. Use of the method of the invention can decrease the number of external components and integrated circuit package pins, and reduce the area required for each signal path on an integrated circuit die, a printed circuit board, or the like.

8 Claims, 8 Drawing Sheets

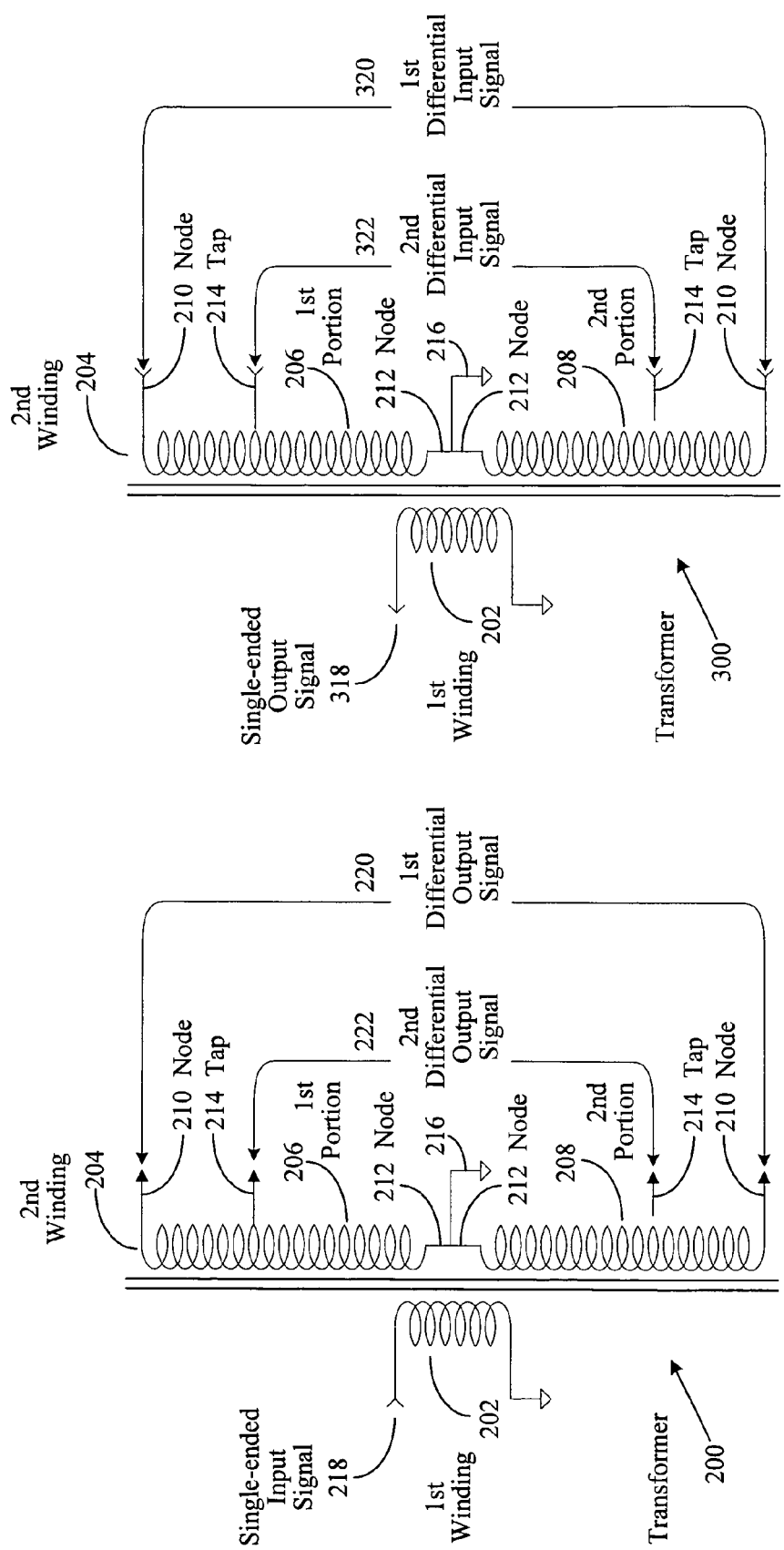

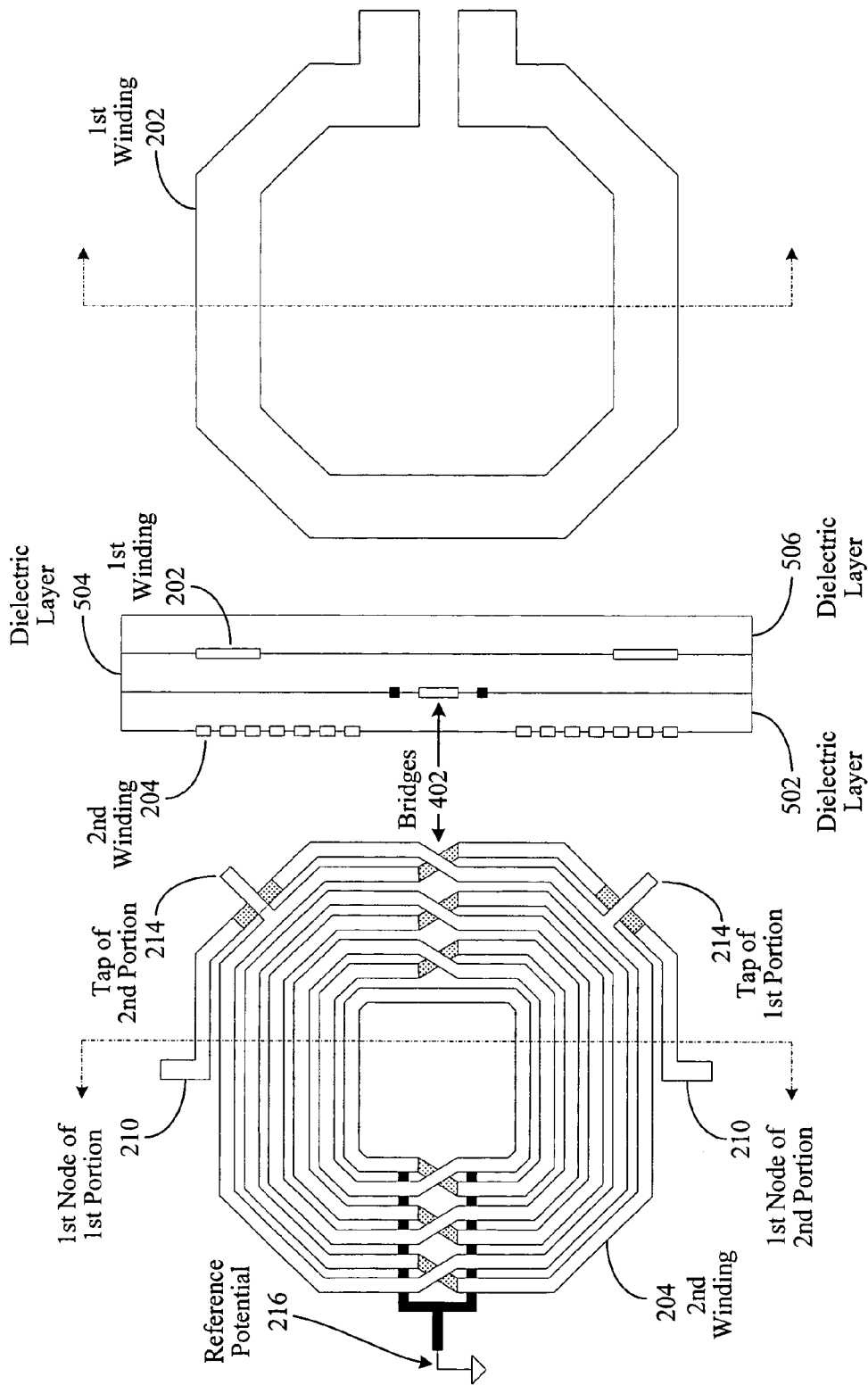

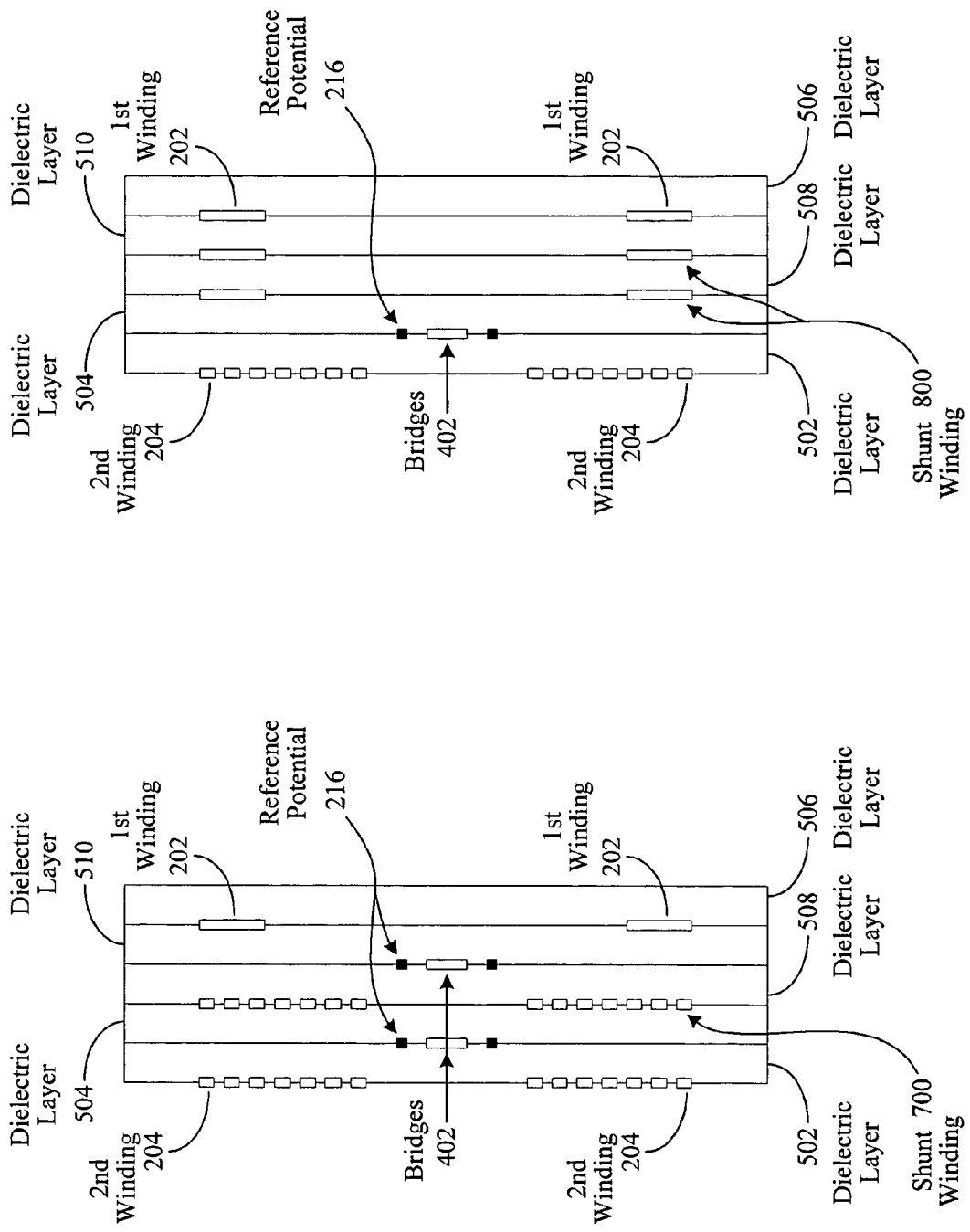

TRANSFORMER-BASED MULTI-BAND RF FRONT-END ARCHITECTURE

BACKGROUND OF THE INVENTION

1. Field of the Invention

The present invention relates in general to the field of radio communications and more particularly, to transformers used within communications systems.

2. Description of the Related Art

Two-way radios, which may be incorporated in wireless communication devices, are known to include an antenna, a transformer, a switch, a receiver section, and a transmitter section. The transformer may be a transformer balun (balanced/unbalanced) and is generally used to convert single-ended signals into differential signals and conversely to convert differential signals into single-ended signals. For example, radio frequency (RF) signals received via the antenna are converted into differential signals, which are provided to a low noise amplifier of the receiver section. Conversely, differential signals from a power amplifier of the transmitter section are converted into single-ended signals, which are provided to the antenna.

As the demand for integrated radios increases, many attempts have been made to integrate transformers and/or transformer baluns with radio frequency integrated circuits. However, such integration has been limited due to flux leakage, capacitive coupling limits, and significant series resistance. To reduce these limitations, advances have been made in transformer integrated circuit design including coplanar interleaved transformers, toroidal and concentric transformers, overlay transformers and symmetric coplanar transformers.

Coplanar interleaved transformers have the primary and secondary windings interleaved on the same integrated circuit layer, where the primary and secondary windings are constructed of planar metal traces. While coplanar interleaved transformers reduce size and resistance and are widely used, they suffer from a low quality (Q) factor, small coupling coefficients and, if used as a balun, the center tap is often at an undesirable location, resulting in an asymmetric geometry. As is known to those of skill in the art, asymmetry of a transformer winding causes an imbalance in the resulting differential signal and/or an imbalance in the resulting single-ended signal from a differential signal.

Toroidal and concentric transformers can have the primary and secondary windings on several dielectric layers of an integrated circuit. Each layer includes a plurality of primary and secondary turns, where turns on different layers are coupled in series using vias. Each of the primary turns on each layer is constructed around the secondary turns on the same layer. While such toroidal and concentric transformers are well suited for multi-layer structures, they suffer from weak coupling, inconvenient center tap locations and are asymmetrical.

Overlay transformers include a primary spiral inductor on a top layer and a secondary spiral inductor on a lower layer. Such transformers have high coupling coefficients and relatively small area; however, the secondary is asymmetrical creating a loading asymmetry.

Symmetric coplanar transformers include the primary and secondary windings on the same layer with interconnecting bridges on lower layers. While such transformers have high symmetry, they have weak magnetic coupling and are usually large for desirable inductor values.

While each of these various embodiments of on-chip transformers have utility and certain applications they do not currently provide for coupling two or more frequency bands through a single transformer. Therefore, what is needed is an integrated radio chip, comprising a single transformer, which allows two or more signal paths with different frequency bands of operation.

SUMMARY OF THE INVENTION

The method and apparatus of the present invention offers improvements over prior art by providing multiple signal paths, with different frequency bands of operation, to be realized with a single transformer thereby reducing the area required for each signal path on an integrated circuit die.

In one embodiment of the invention, an on-chip multiple tap transformer balun (balanced/unbalanced) includes a first winding and a second winding having two portions. The first winding is on a first layer of an integrated circuit and is operably coupled for a single-ended signal. The first and second portions of the second winding are on a second layer of the integrated circuit. The first portion of the second winding includes a first node, a second node, and a tap. The first node is operably coupled to receive a first leg of a first differential signal and the second node is coupled to a reference potential, which may be RF ground. The tap of the first portion is operably coupled for a first leg of a second differential signal. The second portion of the second winding includes a first node, a second node, and a tap. The first node is operably coupled to receive a second leg of the first differential signal and the second node is operably coupled to the reference potential. The tap of the second portion is coupled for a second leg of the second differential signal. The first and second portions of the second winding are symmetrical with respect to the first and second nodes and with respect to the tap nodes. Such an on-chip multiple tap transformer balun may be used to convert single-ended signals into one or more differential signals. Further, the on-chip multiple tap transformer balun may be used to convert one or more differential signals into a single-ended signal.

In another embodiment of the invention, a multi-tap differential transformer includes a first winding and a second winding. The first winding is on a first layer of an integrated circuit and is coupled for a single-ended signal. The second winding is on a second layer of the integrated circuit and is coupled to receive first and second differential signals. To receive such differential signals, the second winding includes first and second nodes that are coupled to receive the first differential signal and first and second taps to receive the second differential signal. A third tap of the secondary is coupled to a reference potential. The second winding is symmetrical about the third tap to produce a symmetrical on-chip multi-tap transformer balun.

In one embodiment of the invention, an on-chip multi-tap differential inductor includes a first winding and a second winding. Each winding is on the same layer of an integrated circuit. The first winding includes a first node that is coupled to receive a first leg of a differential signal and a second node coupled to a reference potential. The first winding also includes a tap that is operably coupled to receive a first leg of a second differential signal. The second winding includes a first node coupled to receive a second leg of the first differential signal and a second node coupled to the reference potential. The second winding further includes a tap operably coupled for a second leg of the second differential signal. The second winding is substantially symmetrical to the first winding and the tap of the first winding is substantially symmetrical to the tap of the second winding.

The various embodiments of multiple tap differential transformer baluns and differential inductors provide for multiple uses in various applications including radio frequency integrated circuits. An on-chip multi-tap transformer balun or inductor, comprising one or more sets of taps in the transformer or inductor, may be used in a variety of different manners, which may correspond to different operating frequencies, different desired inductances, different transformer ratios, et cetera.

Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 is a schematic diagram of a multi-tap transformer balun.

FIG. 3 is a schematic diagram of an alternate multiple tap transformer balun in accordance with the present invention.

FIG. 4 illustrates a top view of a multi-tap winding of a multi-tap transformer balun or inductor in accordance with the present invention.

FIG. 5 is a cross sectional view of a multi-tap transformer balun or inductor in accordance with the present invention.

FIG. 6 is a bottom view of a first winding of an on-chip multi-tap transformer balun in accordance with the present invention.

FIG. 7 is a cross-sectional view of a multi-layered multiple tap transformer balun in accordance with the present invention.

FIG. 8 is a cross sectional diagram of an alternate on-chip multi-tap transformer balun in accordance with the present invention.

DETAILED DESCRIPTION

Figure 1A:
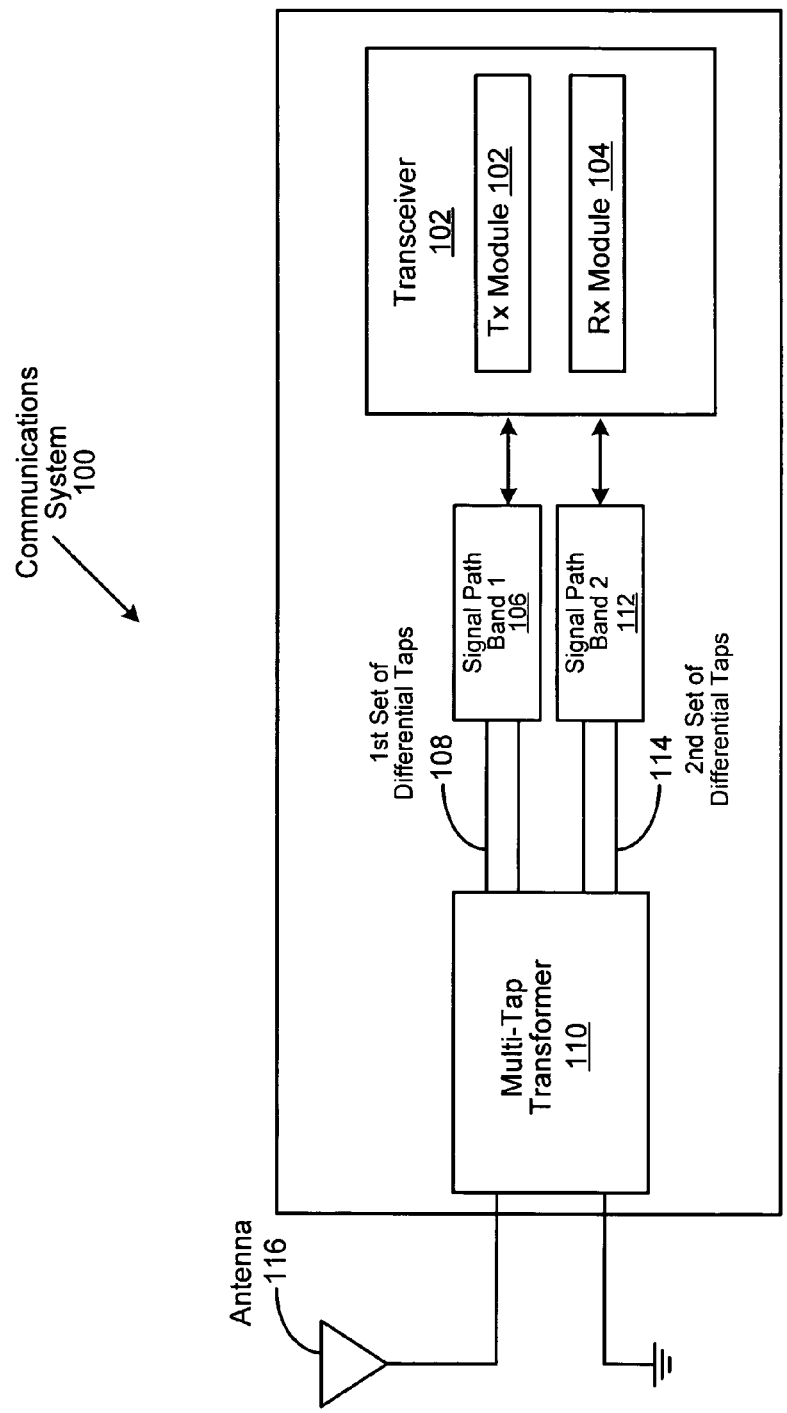
FIG. 1a is a generalized illustration of a multi-tap transformer balun, in accordance with the present invention, providing two signal paths of different frequencies coupled to a single port (multi-band) antenna.

FIG. 1a is a generalized illustration of a communication system 100 implementing a one embodiment of the invention comprising a multi-tap transformer balun in accordance with the present invention. The communications system comprises a transceiver 102 having a transceiver module 102 operable to generate outbound RF signals and a receiver module 104 operable to receive inbound RF signals. A first signal path 106 is provided by a first set of differential taps 108 coupled to the multi-tap transformer 110, as discussed in greater detail hereinbelow. Likewise a second signal path is provided by a second set of differential taps 114 coupled to the multi-tap transformer 110 (hereinafter sometimes referred to as a "balun"). The two signal paths 106 and 112 are operable to facilitate signals in different frequency bands. In the embodiment of the invention shown in FIG. 1, signals at different frequencies are received and transmitted through a single port to an antenna 116.

Figure 1B:
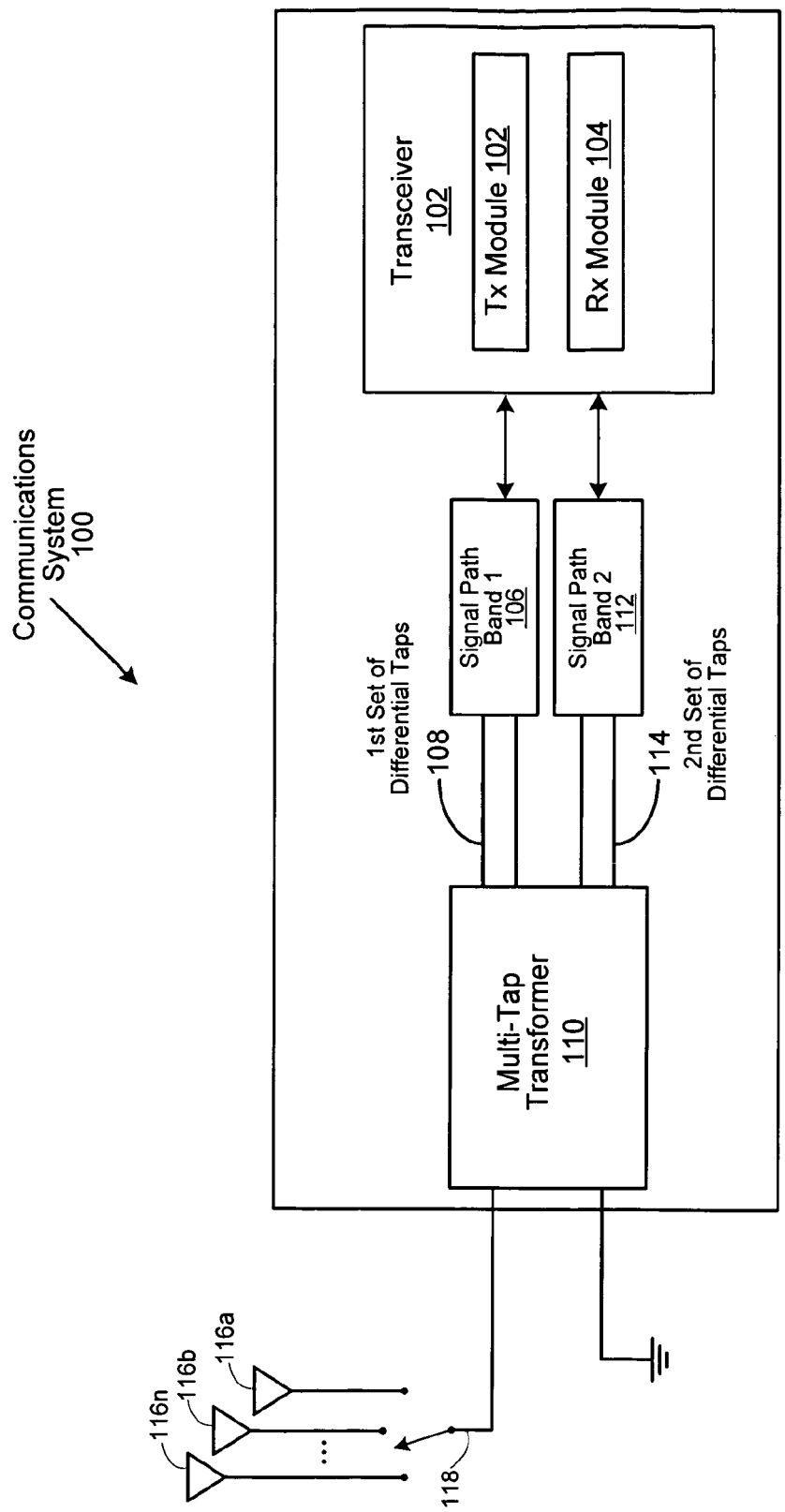
FIG. 1b is an illustration of a multi-tap transformer balun, in accordance with the present invention, providing two signal paths that may be of different frequencies through a single primary winding node, coupled to one of a plurality of antennas through a select switch.

FIG. 1b shows an alternate embodiment of the invention wherein a plurality of antennas 116a, 116b, . . . , 116n are connected to the multi-tap transformer 110 by a select switch 118. In the embodiment of the invention illustrated in FIG. 1b, signal paths 106 and 112 provide two signal paths, that may be of different frequencies, through a single primary winding node of the multi-tap transformer 110 that is coupled to one of the plurality of antennas 11a, 116b, . . . ,116n via the select switch 118.

Figure 1C:
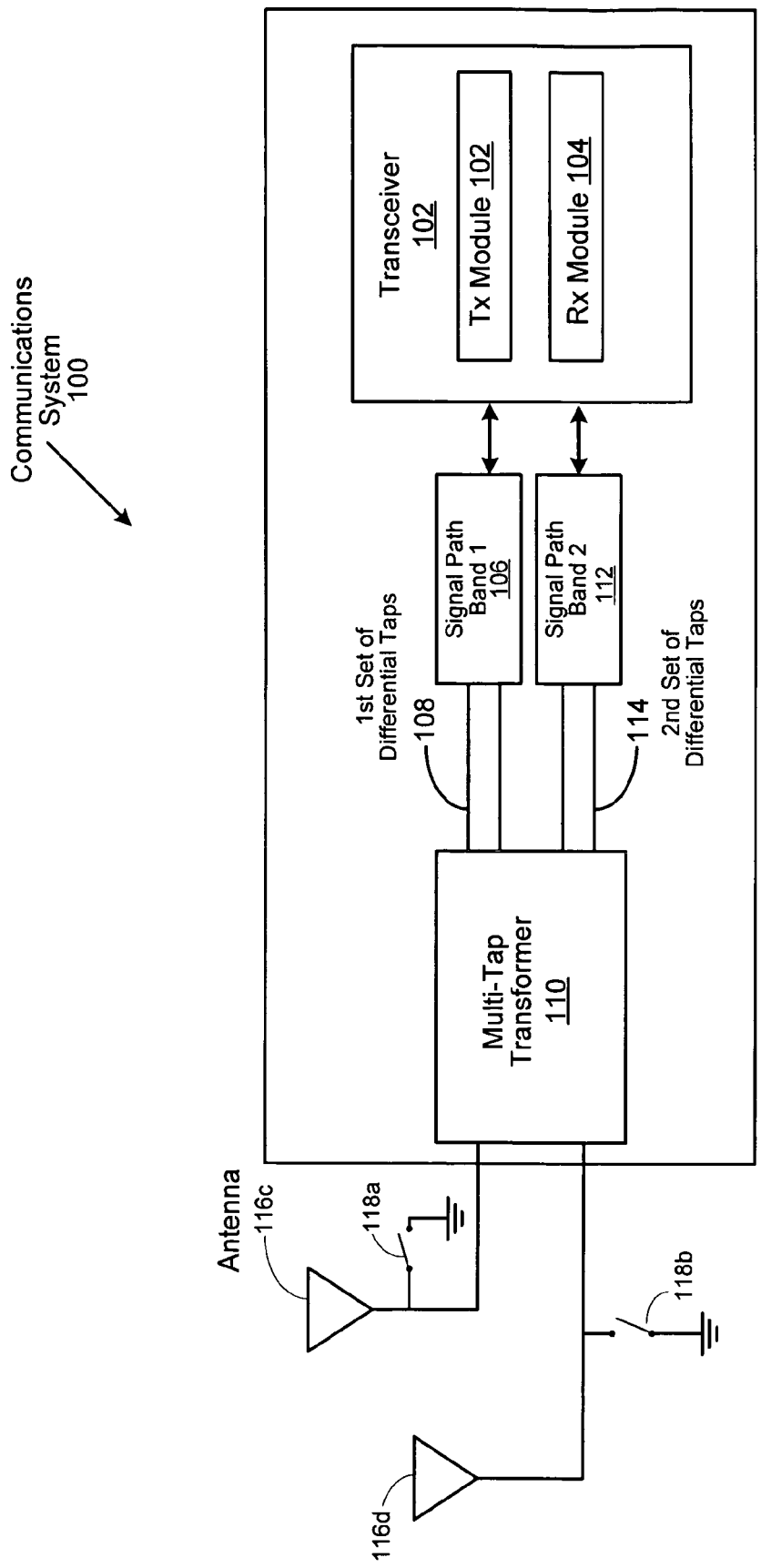
FIG. 1c is an illustration of an alternate embodiment of a communications system using a multi-tap transformer balun in accordance with the present invention wherein two antennas are coupled to the primary winding nodes of the balun.

FIG. 1c is an illustration of an alternate embodiment of a communications system using a multi-tap transformer balun in accordance with the present invention. In the embodiment shown in FIG. 1c, two antennas 116c and 116d are coupled to the primary winding nodes of the multi-tap transformer 110. Switches 118a and 118b are coupled to antennas 116c and 116d, respectively, to deselect one of the antennas. In the closed position the switches connect the respective node to a reference potential which may be RF ground. The antenna connected to the closed switch node is effectively deselected. The antenna at the other node (with the open switch) is connected to the multi-tap transformer 110 thereby allowing transmission of signals through the first signal path 106 and second signal path 112.

FIG. 2 is a schematic diagram of an on-chip multi-tap transformer balun 200 that is operably coupled to convert a single-ended input signal 212 into a first differential output signal 214 and a second differential output signal 216. The transformer 200 includes a first winding 202 and a second winding 204. The second winding includes a first portion 206 and a second portion 208 each of which includes a first node 210, a second node 212 and a tap 214. The second nodes 212 of the first portion 206 and the second portion 208 of the second winding 204 are operably coupled to a reference potential 216. The tap 214 of the first portion 206, and the tap 214 of the second portion 208 of the second winding 204 are operably coupled to produce the second differential output signal 220. The first node 210 of the first portion 206, and the first node 210 of the second portion 208 of the second winding 204 are operably coupled to produce the first differential output signal 218.

The taps are symmetrical with respect to the second nodes 212 coupled to the AC ground reference potential 216. The first portion 206 and second portion 208 of the second winding 204 are symmetrical to each other such that balance differential output signals 218 and 220 are produced. The turns ratio between the first winding 202 and the second winding 204 depends on the desired gain to be achieved via the transformer. For example, the primary winding 202 may consist of two turns while the second winding 204 consists of nine turns. As those of skill in the art will appreciate, other combinations of turn ratios may be used to provide a desired gain. As those of skill in the art will further appreciate, in many applications, only one set of the differential outputs will be in use at a given time.

FIG. 3 illustrates an on-chip multi-tap transformer balun 300 that is operably coupled to convert one or more differential input signals 320 and 322 into a single-ended output signal 318. In this embodiment, the transformer 300 again includes the first winding 202 and second winding 204. In this embodiment, the first differential input signal 320 or the second differential input signal 322 will be coupled to the secondary winding 204. As such, the first winding 202 produces a single-ended output signal 318 corresponding to either the first differential input signal 320 or the second differential input signal 322.

The second winding 204 includes a first portion 206 and a second portion 208, each having a first node 210, a second node 212, and a tap 214. The second nodes 212 of the respective portions of the second winding 204 are operably coupled to the AC ground reference potential 216 and the first nodes 210 of the respective portions are coupled to receive the first differential input signal 318. The taps 214 of each portion of the second winding 204 are operably coupled to receive the second differential input signal 320.

Those of skill in the art will appreciate, the first differential input signals 320 and second differential input signals 322, may be used individually or simultaneously to provide inputs to the transformer 300 as long as, for simultaneous use, the inputting of two signals does not saturate the transformer. The resulting single-ended output signal 318 will represent a mixing of the first differential input signals 320 and the second differential input signal 322.

FIGS. 4 through 6 illustrate a physical embodiment of the transformers 200 or 300 of FIGS. 1 and 2. FIG. 3 illustrates the top view of the second winding 204. As shown, the second winding 204 includes a first node 210 of a second portion 208, a tap 214 of the first portion 206, bridges 402, a tap 214 of the second portion 208, a first node 210 of the first portion 206, and second nodes 212 of the first portion 206 and second portion 208, coupling to a reference potential 216. The number of turns for the second winding 204 may vary from one to multiple turns. The second winding 204 may be fabricated utilizing the metalization layer of the integrated circuit having the lowest resistivity. Typically, for a CMOS process, this particular metalization layer is the top metal layer.

FIG. 4 further illustrates a physical embodiment for a multi-tap differential inductor. For this inductor, the first winding 202 corresponds to the first portion 206 of the second winding 204 and the second winding 204 corresponds to the second portion 208. As will be discussed in greater detail with reference to FIGS. 7 and 8, if FIG. 3 is constructed to implement a multi-tap differential inductor, the second winding 204 may include shunt windings on different layers. By utilizing shunt windings, the series resistance of the inductor decreases, thereby increasing the quality factor of the inductor.

FIG. 5 illustrates a cross sectional view of transformer 200 or 300, to include dielectric layer 502, dielectric layer 504, and dielectric layer 506. The dielectric layer 502 supports a first metalization layer that is used to fabricate the second winding 204. The dielectric layer 504 supports the bridges 402 and the coupling to the reference potential 216. The dielectric layer 506 supports the first winding 202.

FIG. 6 illustrates a bottom view of transformer 200 or 300 and illustrates the geometric shape of an embodiment of the first winding 202. The first winding 202 is shown to include one turn but may include multiple turns depending on the desired turns ratio for transformer 200 or 300.

FIG. 7 illustrates an alternate cross sectional view of transformer 200 and 300 where the second winding 204 includes a shunt winding 700. In this embodiment, two additional dielectric layers 508 and 510 are illustrated. As shown, the shunt winding 700 is supported by dielectric layer 508, and the corresponding bridges 402 and coupling to reference potential 216 are supported by dielectric layer 510. The shunt winding 700 is coupled in parallel with the second winding 204 to reduce the resistivity of the second winding 204. The first winding 202 is supported by dielectric layer 506.

FIG. 8 illustrates an alternate cross sectional view of transformer 200 or 300 that includes the primary winding 202 including one or more shunt windings 800. In this example, the primary winding 202 includes two shunt windings 800. As shown, the additional shunt windings are supported by dielectric layers 508 and 510.

Those of skill in the art will appreciate, the second winding 204 as well as the first winding 202 may include shunt windings 800. As such, a transformer incorporating a combination of FIGS. 7 and 8 may be readily obtained.

Figure 9:
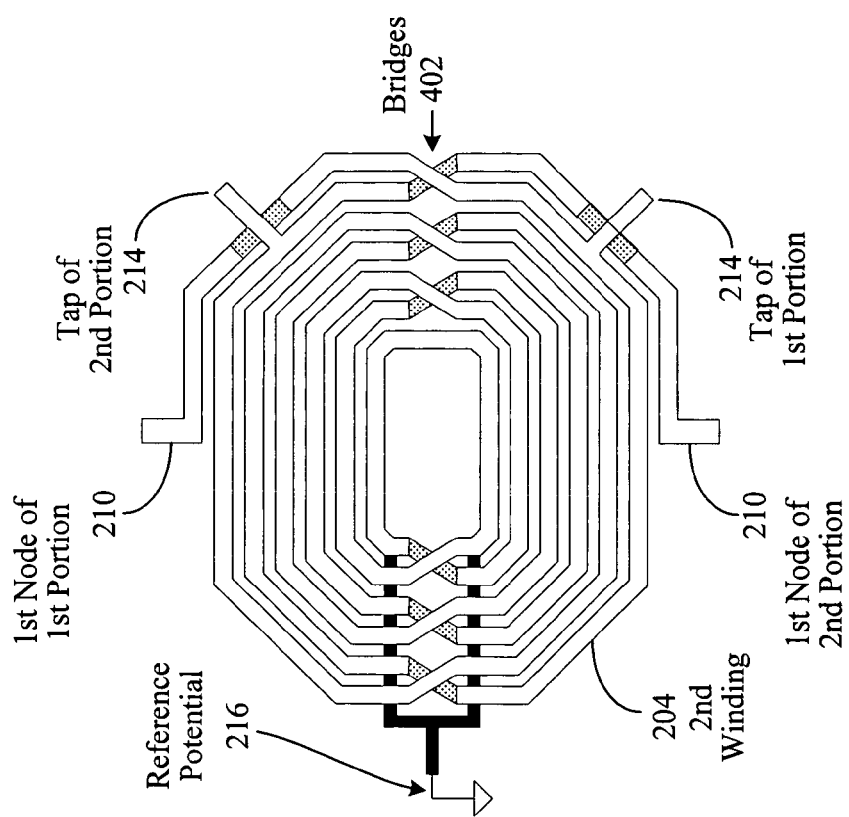
FIG. 9 is a graphical representation of an alternate 2.sup.nd winding for an on-chip multi-tap transformer balun or a on-chip multi-tap inductor in accordance with the present invention.

FIG. 9 illustrates an alternate geometric shape for the second winding 204 or for the multi-tap differential inductor. In this configuration, the geometric shape corresponds to a rectangular octagonal shape. The particular length and width of the rectangular octagonal shape is based on a balancing of the inductance value, the turns ratio, the quality factor and capacitance of the windings.

As shown, the second winding 204 includes the first node 210 of the second portion, a tap 214 of the first portion 206, bridges 402, a tap 214 of the second portion 208, a first node 210 of the first portion 206, and coupling to a reference potential 216.

Figure 10:
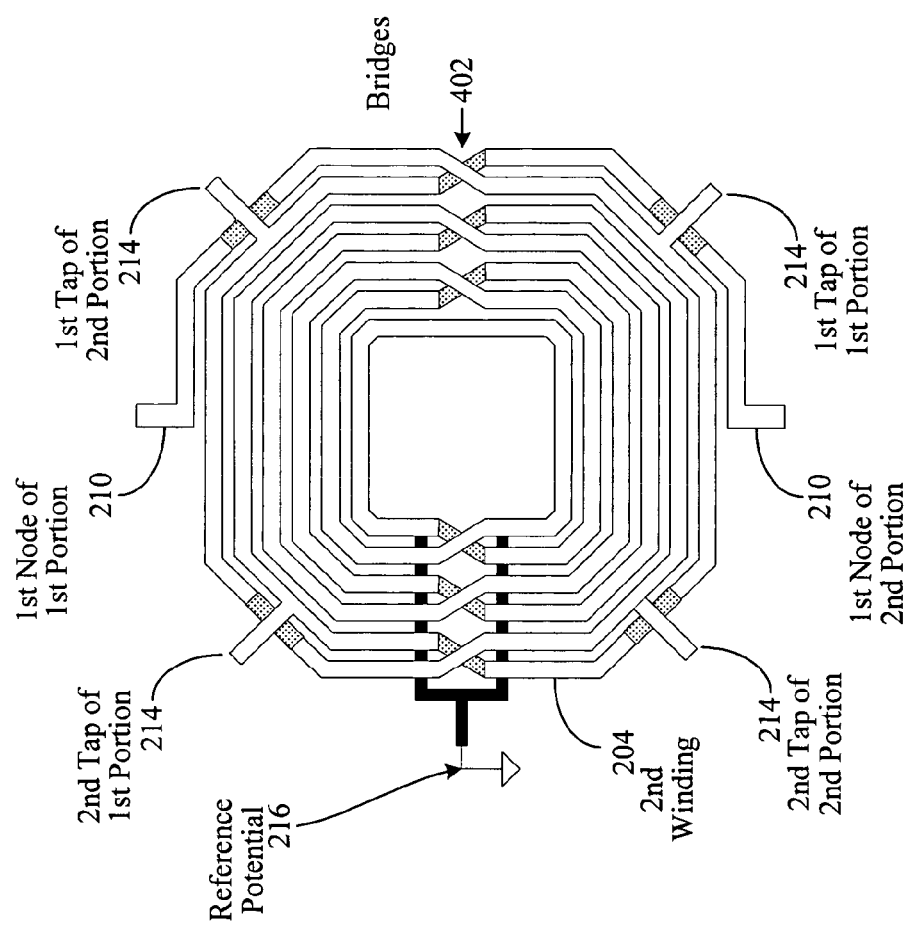
FIG. 10 is a diagram of an alternate second winding for an on-chip multi-tap transformer balun or inductor in accordance with the present invention.

FIG. 10 illustrates an alternate embodiment of the second winding 204 of the multi-tap differential inductor. In this embodiment, the first portion 206 and second portion 208 each include a first tap 214 and second tap 214. The second tap 214 of the first portion and the second tap 214 of the second portion 208 are operably coupled to receive a third differential signal.

As shown, the first portion 206 includes a first tap 214 and a second tap 214 and two nodes 210. The second portion 208 includes a first node 210 and second node 212 and two taps 214. The bridges are used to couple the various windings together and to maintain symmetry of the second winding 204.

At a minimum, the invention allows two different signal paths to be coupled to a multi-tap transformer balun. The multi-tap transformer has a primary, which is coupled to a single antenna, and two or more different secondary ports. Each of these ports has one or more taps, which are optimized separately for each of the signal paths, allowing each of the two or more signal paths to operate in different frequency bands.

Furthermore, because each path is optimized independently, each path can exhibit good performance. Moreover, without the use of the invention, the signal paths might have to remain separate until going off-chip, more than a single antenna might be required, and an off-chip switch may be required. In addition, increased integrated chip die area, printed circuit trace area, or the like, in combination with higher package pin count and additional external components, may be necessary.

Skilled practitioners in the art will recognize that many other embodiments and different variations of the described invention are possible. For example, the described multi-tap transformer balun allows the use of two or more differential signals, coupled single-endedly to a single antenna. A modified multi-tap transformer balun could allow two or more single-ended signals to be coupled single-endedly to a single antenna. A modified multi-tap transformer could also allow two or more different signal paths, (e.g., single-ended or differential) to be coupled to a single antenna. Other variations might involve the switching in-and-out of capacitors at each port to assist in tuning over different frequency bands.

Furthermore, those possessing skill in the art will realize that other embodiments of the invention not limited to the use of a single antenna, may be derived, without deviating from the scope of the claims. For example, differential secondaries and a primary winding of a multi-tap transformer balun can be implemented, with one side of the primary winding grounded, and the other side of the primary winding coupled to the antenna. As a second frequency band of operation is required, the grounded port of the primary winding can instead be coupled to a second antenna, and the other port of the primary winding can be grounded.

Although the present invention has been described in detail, it should be understood that various changes, substitutions and alterations can be made hereto without departing from the spirit and scope of the invention as defined by the appended claims.

What is claimed is:

1. A communication system, comprising:
   a receiver module operable to receive an inbound radio frequency (RF) signal;
   a transmitter module operable to generate an outbound RF signal; and
   an on-chip multiple tap transformer balun for coupling to an antenna, the receiver module and the transmitter module, the transformer balun being operable to receive the inbound RF signal from the antenna and further operable to provide the outbound RF signal to the antenna;
   wherein the transformer balun comprises:
   a first winding on a first layer of an integrated circuit, wherein the first winding is a primary winding of the transformer balun for coupling to the antenna for a single-ended operation;
   a first portion of a second winding on a second layer of the integrated circuit in which the second winding is a secondary winding of the transformer balun, wherein a first node of the first portion of the second winding is operably coupled to a first leg of a first differential signal path, wherein a second node of the first portion of the second winding is operably coupled to a reference potential, and wherein a tap of the first portion of the second winding is operably coupled to a first leg of a second differential signal path; and
   a second portion of the second winding on the second layer, wherein a first node of the second portion of the second winding is operably coupled to a second leg of the first differential signal path, wherein a second node of the second portion of the second winding is operably coupled to the reference potential, wherein a tap of the second portion of the second winding is operably coupled to a second leg of the second differential signal path, wherein the second portion of the second winding is substantially symmetrical to the first portion of the second winding, and wherein the tap of the first portion of the second winding is substantially symmetrical to the tap of the second portion of the second winding;
   wherein the first differential signal path couples to the receiver and transmitter modules to transfer RF signals of a first range of frequencies and the second differential signal path couples to the receiver and transmitter modules to transfer RF signals of a second range of frequencies different from the first range of frequencies, and wherein the second windings are selected for operation at the first range of frequencies and locations of the taps are selected for operation at the second range of frequencies.

2. The on-chip multiple tap transformer balun of claim 1 further comprises a shunt winding on a third layer of the integrated circuit, wherein the shunt winding is connected in parallel with the second winding.

3. The on-chip multiple tap transformer balun of claim 1, wherein the second winding further comprises:
   a rectangular octagonal shape having a first dimension lengthened with respect to a square octagonal reference shape and having a second dimension shortened with respect to the square octagonal reference shape, wherein an area of the rectangular octagonal shape is similar to an area of the square octagonal reference shape.

4. A method of balancing radio frequency (RF) signals in a communication system, comprising:
   operably coupling a transformer balun to an antenna and to a transceiver module; and
   using the transformer balun to provide impedance matching for RF signals communicated between the antenna and the transceiver module;
   wherein the transformer balun comprises:
   a first winding on a first layer of an integrated circuit, wherein the first winding is a primary winding of the transformer balun for coupling to the antenna for a single-ended operation;
   a first portion of a second winding on a second layer of the integrated circuit in which the second winding is a secondary winding of the transformer balun, wherein a first node of the first portion of the second winding is operably coupled to a first leg of a first differential signal path, wherein a second node of the first portion of the second winding is operably coupled to a reference potential, and wherein a tap of the first portion of the second winding is operably coupled to a first leg of a second differential signal path; and
   a second portion of the second winding on the second layer, wherein a first node of the second portion of the second winding is operably coupled to a second leg of the first differential signal path, wherein a second node of the second portion of the second winding is operably coupled to the reference potential, wherein a tap of the second portion of the second winding is operably coupled to a second leg of the second differential signal path, wherein the second portion of the second winding is substantially symmetrical to the first portion of the second winding and wherein the tap of the first portion of the second winding is substantially symmetrical to the tap of the second portion of the second winding;
   wherein the first differential signal path couples to the transceiver module to transfer RF signals of a first range of frequencies and the second differential signal path couples to the transceiver module to transfer RF signals of a second rang of frequencies different from the range of frequencies, and wherein the second windings are selected for operation at the first range of frequencies and locations of the taps are selected for operation at the second range of frequencies.

5. The on-chip multiple tap transformer balun of claim 4 further comprises a shunt winding on a third layer of the integrated circuit, wherein the shunt winding is connected in parallel with the second winding.

6. The on-chip multiple tap transformer balun of claim 4, wherein the second winding further comprises:
   a rectangular octagonal shape having a first dimension lengthened with respect to a square octagonal reference shape and having a second dimension shortened with respect to the square octagonal reference shape, wherein an area of the rectangular octagonal shape is similar to an area of the square octagonal reference shape 7. An apparatus for balancing radio frequency (RF) signals, comprising:
   a first winding on a first layer of an integrated circuit, wherein the first winding is a primary winding of a balun for coupling to an antenna for a single-ended operation;
   a first portion of a second winding on a second layer of the integrated circuit in which the second winding is a secondary winding of the balun, wherein a first node of the first portion of the second winding is operably coupled to a first leg of a first differential signal path, wherein a second node of the first portion of the second winding is operably coupled to a reference potential, and wherein a tap of the first portion of the second winding is operably coupled to a first leg of a second differential signal path; and
   a second portion of the second winding on the second layer, wherein a first node of the second portion of the second winding is operably coupled to a second leg of the first differential signal path, wherein a second node of the second portion of the second winding is operably coupled to the reference potential, wherein a tap of the second portion of the second winding is operably coupled to a second leg of the second differential signal path, wherein the second portion of the second winding is substantially symmetrical to the first portion of the second winding, and wherein the tap of the first portion of the second winding is substantially symmetrical to the tap of the second portion of the second winding;
   wherein the first differential signal path couples to a transceiver module to transfer RF signals of a first range of frequencies and the second differential signal path couples to the transceiver module to transfer RF signals of a second range of frequencies different from the first range of frequencies, and wherein the second windings are selected for operation at the first range of frequencies and locations of the taps are selected for operation at the second range of frequencies.

8. The on-chip multiple tap transformer balun of claim 7 further comprises a shunt winding on a third layer of the integrated circuit, wherein the shunt winding is connected in parallel with the second winding.

\* \* \* \* \*

UNITED STATES PATENT AND TRADEMARK OFFICE
CERTIFICATE OF CORRECTION

| | | |
|---|---|---|
| PATENT NO. | : 7,526,256 B2 | Page 1 of 1 |
| APPLICATION NO. | : 11/136850 | |
| DATED | : April 28, 2009 | |
| INVENTOR(S) | : Iqbal Bhatti et al. | |

It is certified that error appears in the above-identified patent and that said Letters Patent is hereby corrected as shown below:

Column 9, line 4, in Claim 6: replace "shape" with --shape.--

Signed and Sealed this

Fourteenth Day of July, 2009

JOHN DOLL
*Acting Director of the United States Patent and Trademark Office*